Jan. 31, 1967  F. M. REISING  3,300,989
PLASTIC PIPE PLACER MECHANISM
Filed July 13, 1964  2 Sheets-Sheet 1
FIG. 1
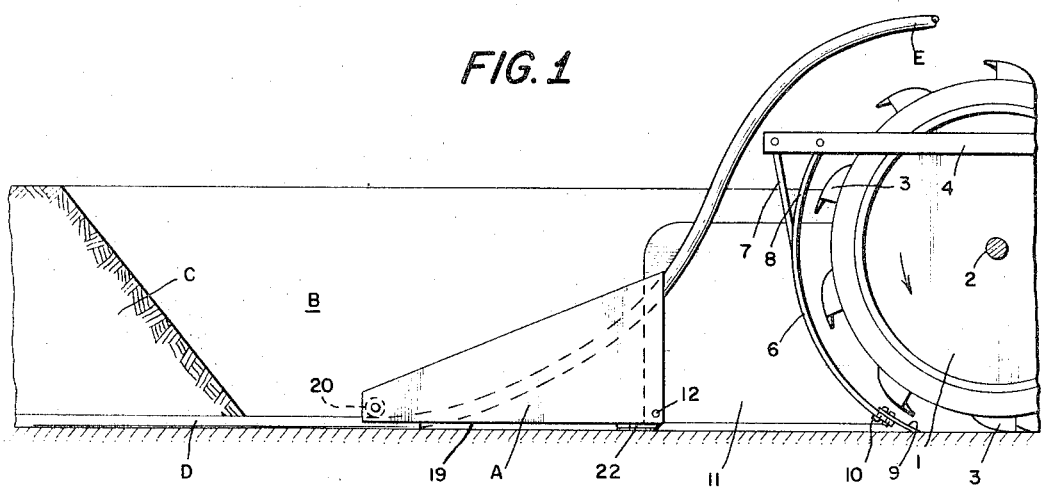
FIG. 7
FIG. 2
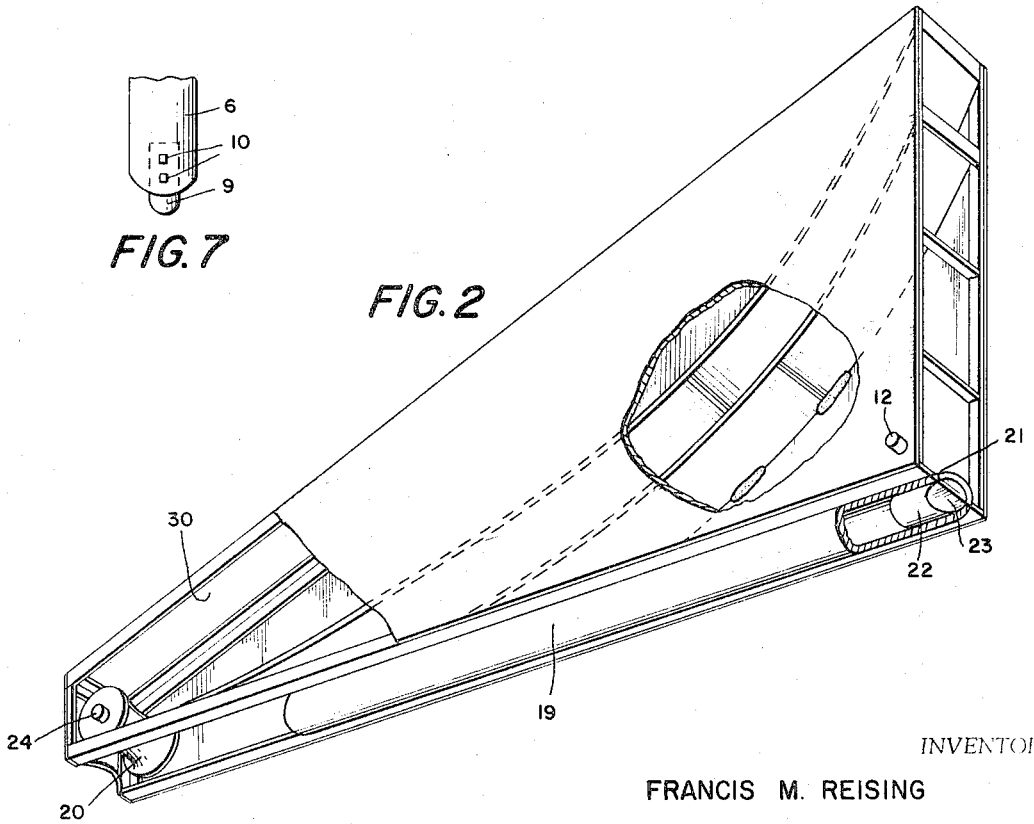
INVENTOR
FRANCIS M. REISING
BY *Ralph L Bassett*
ATTORNEY Jan. 31, 1967    F. M. REISING    3,300,989
PLASTIC PIPE PLACER MECHANISM
Filed July 13, 1964    2 Sheets-Sheet 2

INVENTOR
FRANCIS M. REISING
BY Ralph L Bassett
ATTORNEY

United States Patent Office 3,300,989
Patented Jan. 31, 1967

3,300,989
PLASTIC PIPE PLACER MECHANISM
Francis M. Reising, 310 W. Fay, Edinburg, Tex. 78539
Filed July 13, 1964, Ser. No. 382,198
7 Claims. (Cl. 61—72.6)

This invention relates to improvements in plastic pipe placer mechanisms and has particular reference to means associated with a trencher machine and a dirt filler mechanism for performing a continuous proper laying of plastic pipe.

One of the objects of the invention is to provide a pipe guide for directing the plastic pipe or the like to the bottom of a trench being dug by a power trenching mechanism and in which the pipe guide or pipe placer is moved with the trenching mechanism on a skid for laying pipe flatly in a preformed groove so that it can be immediately covered by a following suitable earth filling means.

Another object of the invention is to provide a pipe guide in which the plastic pipe will be fed without unnecessary bending or distortion so that when positioned in a groove formed in the bottom of the trench it will remain in a horizontal position for filling of the trench.

Another object of the invention is to fabricate a plastic pipe placer so that the assembly will be completely housed and will not become inoperative due to loose earth.

More specifically, the invention includes a plastic pipe placer of general triangular form having means for attachment to a trencher and including a pair of spaced parallel panels between which are spaced arcuate pipe guide means, the arcuate pipe guide means terminating at one end in an opening for receiving the pipe from a suitable source and at the other end in a position for directing the pipe beneath a roller which functions to position the pipe in an arcuate groove in the trench formed by a grooving tool carried by the trencher mechanism.

These and other objects of the invention will more clearly hereinafter appear by reference to the accompanying drawings forming a part of the instant specification and wherein like characters of reference designate corresponding parts throughout the several views, in which:

FIG. 1 is a side elevation showing the present invention associated with a trenching device;

FIG. 2 is a perspective view of the pipe placer with parts broken away in section;

FIG. 7 is a fragmentary view of the grooving tongue carried by the trenching device.

Figure 3:
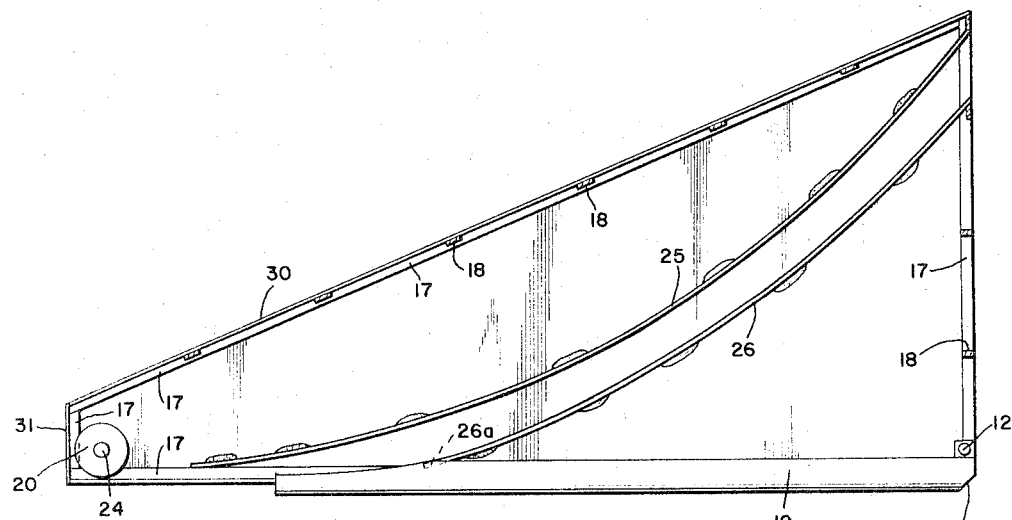
FIG. 3 is a vertical section.
Figure 4:
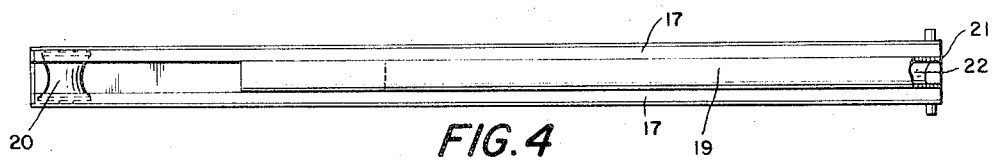
FIG. 4 is a bottom plan view.

Referring to FIG. 1 the assembly is shown moving along a trench formed by the power trenching wheel 1 mounted on axle 2 and driven by any suitable source. The trencher wheel includes a multiplicity of buckets 3 which remove the earth to form the trench and deposit the earth on appropriate loading means for deposit at one side of the trench so that the trench can be refilled by the return of the earth. The trencher wheel carries on a pair of spaced supports 4, a crumb shoe or soil grooving member 6 supported by the depending arms 7 and 8 mounted on the supports 4. The grooving member 6 is provided with a grooving tongue 9 which is removably fixed in position by the bolts 10 so that this grooving tongue 9 may be replaced in the event of wear or should a grooving tongue of different size be required due to the handling of different sized pipe. It will be noted that the crumb shoe or grooving member 6 is mounted to follow the trencher wheel 1 so that when the trench is formed, the crumb shoe 6 will immediately form in the trench a longitudinal recess of annular form of the appropriate depth for the placement of the plastic pipe.

The trencher wheel assembly supports a pair of spaced side panels 11 which follow the walls of the trench as it is formed and tends to pack the earth and support the trench walls during the trenching operation. The bottom of the side panels 11 also provide a drag connection for the plastic shoe placer A shown in FIG. 1 by means of coupling pins 12 which project laterally from the bottoms of the side walls of the pipe placer. In the disclosure of FIG. 1, which is a vertical elevation through a trench, one wall of the trench is shown at B with the fill earth following the trenching and pipe placing mechanism shown at C and the pipe laid and filled at D. The pipe, which is preferably of plastic, is fed from any suitable source to the pipe placer, a terminal of the plastic pipe from such source being shown at E.

The structure of the plastic pipe placer is shown more in detail in FIGS. 3 through 6 and includes a pair of spaced parallel panels 15 and 16 of generally triangular form, each of the panels being formed with a horizontal bottom and a forwardly upwardly inclined top tapering downwardly towards the exit end of the structure. The relatively high vertical entrance or front end of the pipe placer is normally positioned adjacent the trencher tool or other draft mechanism and a relatively short vertical exit or rear end is provided at the rear for reasons to be hereinafter described. The two spaced panels 15 and 16 are formed with reinforcing strips 17 about their inner marginal edges and spacer elements 18 connect the side panels at the inclined tops and at the relatively high entrance end of the structure, as best shown in FIG. 3.

Figure 6:
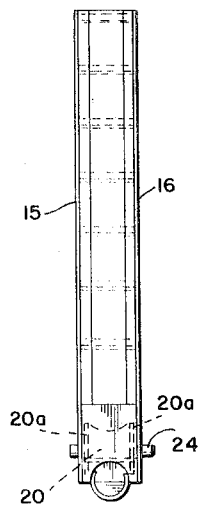
FIG. 6 is a front elevation.
Figure 5:
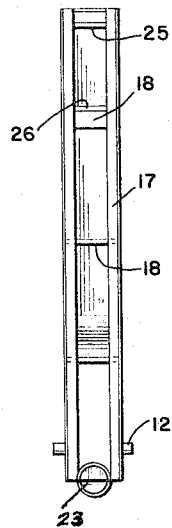
FIG. 5 is a rear elevation.

At the bottom of the spacer structure 18 and bottom of the panels 15 and 16 is an elongated tubular skid 19 which extends from the entrance end of the assembly throughout the major portion of its length to a point relatively close to the guide roller 20. The elongated cylindrical skid 19 has its front end 21 provided with a plug 22, the bottom half of which is beveled at 23, as best shown in FIG. 3, so that it will follow freely along the trench in the path of the groove formed by the grooving tongue 9 carried by the crumb shoe 6. This elongated cylindrical skid 19 provides a support for the pipe placer and likewise functions to compact the earth in the groove formed by the grooving tongue 9 in which the pipe is to be laid. As shown in FIGS. 5 and 6 the skid 19 projects about half of its diameter below the pipe placer structure which represents approximately the depth of the groove to be cut by the grooving tongue.

The entire structure, including the reinforcing strip 17 and the side panels 15 and 16, are made of structural steel and accordingly the skid member 19 can readily be welded along its sides to the adjacent sides of the reinforcing strip 17 and the panels 15 and 16 between which it is positioned at the bottom of the assembly.

The roller or spool 20 has a recessed peripheral face as shown and is preferably formed of wood and has steel flanges or plates 20a at each end. The roller 20 is mounted for free rotation on an axle or terminal pins 24 where are mounted in suitable bearings in the side panels 15 and 16. Curved parallel horizontally positioned guide plates 25 and 26 extend from the top portion of the high forward end of the pipe placer device to the lower outer or discharge end of the device, as shown in FIG. 3, these curved parallel plates 25 and 26 having a curvature comprehending a minimum deformation of the pipe E during its travel therethrough to and beneath the roller 20 at the discharge end of the assembly. The plates 25 and 26 extend from side wall panel 15 to side wall panel 16 and will be welded at appropriate points throughout their length to these panels to maintain them properly spaced during usage and to insure the travel of the pipe in proper angular relationship to the point of contact with the bottom curved surface of the roller 20.

The top panel 25 extends forwardly to a point close to the roller 20 and the angle of the plate at its end adjacent the roller is so positioned that the top surface of the pipe E traveling thereagainst will normally engage and contact the bottom surface of the roller 20. The lower transverse panel 26 terminates inward of the top panel 25 and has its terminal 26a seated upon the top of the elongated tubular skid 19 and being formed with a recess to embrace the top of the skid body so as to generally reinforce and transversely stabilize the structure.

The present structure is shown to include the top housing 30 extending across the spaced elements 18 and the exit housing sheet 31. The front or high end of the assembly can likewise be closed in, if desired. The bottom is substantially closed by the skid 19 which is positioned between and connects the reinforcing strips 17. By the above construction and arrangement a fabricated plastic pipe layer is provided which involves all the essential characteristics necessary to perform the desired function and is adapted to be connected by the coupling pins 12 to the rear panels 11 of the trencher assembly and to be moved along the trench as the latter is being formed by the trencher wheel 1.

The skid 19 of the present assembly is constructed and arranged to travel in the groove formed by the grooving tongue 9 carried by the crumb shoe 6 of the trencher assembly and will compact the groove to provide for the seating and positioning of the plastic pipe E as it is fed through the apparatus. The plastic pipe E is confined in its travel between the curved spaced guide plates 25 and 26 which direct the plastic pipe beneath the roller 20 which tends to force the plastic pipe into the groove behind the path of movement of the skid 19. It will be understood that in normal use as the plastic pipe is laid and seated in its groove rearward of the travel of the skid 19, an appropriate trench filler mechanism will immediately apply the earth as shown at C in FIG. 1.

It is to be understood that the high vertical side of the present assembly is referred to as the front of the apparatus as this is the receiving end for the plastic pipe and the forward end of the apparatus insofar as the direction of travel and use is concerned. The short end with the roller 20 is the outer end or discharge end of the assembly and represents the point of final placement of the plastic pipe in its groove or channel.

What is claimed is:

1. In a pipe placer device for use with a trenching apparatus, said pipe placer device comprising a pair of spaced panels of generally triangular form, reinforcing means about certain of the marginal edges of said panels, spacers connecting the reinforcing means, a skid device for said spacers including an elongated cylindrical structure welded to the bottom side edges of said panels throughout its length and depending therebelow, the front end of said skid device having a downwardly and inwardly inclined closed end and the opposite end of said skid device being spaced forwardly from the discharge end of the device, a guide roller fixed to and extending transversely of the walls of the panels at the discharge end of the device and spaced upwardly and rearwardly from said opposite end of said skid device, and upper and lower spaced horizontal guide plates extending from the upper end portion of the front end of the pipe placer device to a point forward of said roller with the lower end of the lower plate terminating forwardly of the said opposite end of the skid device and said upper plate terminating rearwardly of said opposite end to direct a plastic pipe to a position beneath said guide roller, said spaced guide plates being fixed at their marginal edges to said side panels.

2. The structure of claim 1 characterized in that the upper horizontal guide plate extends outwardly of the lower horizontal guide plate and the latter is mounted upon the adjacent portion of the skid device.

3. The structure of claim 1 characterized in that the elongated cylindrical skid device is of tubular form and has its front end closed by a plug and formed with a downwardly and rearwardly extending inclined face.

4. The structure of claim 1 characterized in that the guide roller is rotatably mounted between and supported by the walls of the panels and is positioned inwardly of the rear and bottom edges of the pipe placer device.

5. The structure of claim 1 characterized in that the guide roller has a curved peripheral surface which is positioned in line with the bottom edge of the upper horizontal guide plate.

6. The structure of claim 1 characterized in that the pipe placer device is enhoused by outer panels fixed at its top and rear end.

7. The structure of claim 1 characterized in that the elongated cylindrical skid device is of tubular form and has its front end closed by a plug and formed with a downwardly and rearwardly extending inclined face and its rear top portion is cut away to provide for the passage of the plastic pipe.

References Cited by the Examiner

UNITED STATES PATENTS

| 2,812,731 | 11/1957 | Gardner | 61—72.6 |
| 3,170,301 | 2/1965 | Kelley | 61—72.6 |
| 3,201,948 | 8/1965 | Schramm | 61—72.6 |

FOREIGN PATENTS

| 1,156,475 | 12/1957 | France. |
| 570,970 | 7/1945 | Great Britain. |

EARL J. WITMER, *Primary Examiner.*